United States Patent [19]

Gover et al.

[11] Patent Number: 4,833,462

[45] Date of Patent: May 23, 1989

[54] RASTER-SCANNED CATHODE RAY TUBE DISPLAY WITH CROSS-HAIR CURSOR

[75] Inventors: David J. Gover; Adrian J. Hawes, both of Eastleigh, England

[73] Assignee: International Business Machines Corporation, Armonk, N.Y.

[21] Appl. No.: 639,760

[22] Filed: Aug. 13, 1984

[30] Foreign Application Priority Data

Dec. 22, 1983 [EP] European Pat. Off. ........ 83307891.8

[51] Int. Cl.[4] ........................ G09G 1/16; G06F 3/153

[52] U.S. Cl. .................................... 340/709; 340/706

[58] Field of Search ............... 340/709, 710, 734, 736, 340/728, 745, 703, 706

[56] References Cited

U.S. PATENT DOCUMENTS

| | | | |
|---|---|---|---|
| Re. 31,200 | 4/1983 | Sukonick et al. | 340/709 |
| 4,190,834 | 2/1980 | Doornink | 340/709 |
| 4,215,414 | 7/1980 | Huelsman | 340/728 |
| 4,308,532 | 12/1981 | Murphy | 340/728 |
| 4,354,184 | 10/1982 | Woborschil | 340/709 |
| 4,354,186 | 10/1982 | Groothuis | 340/703 |
| 4,454,507 | 6/1984 | Srinivasan et al. | 340/709 |
| 4,521,774 | 6/1985 | Murphy | 340/745 |
| 4,625,202 | 11/1986 | Richmond et al. | 340/709 |

FOREIGN PATENT DOCUMENTS 0009390 9/1979 European Pat. Off. .

OTHER PUBLICATIONS

IBM Technical Disclosure Bulletin, vol. 23, No. 6, Nov. 1980, pp. 2342–2343, D. R. Mersel, "Highlighting Image Data on Pel for Pel Addressable Displays."

IBM Technical Disclosure Bulletin, vol. 19, No. 6, Nov. 1976, pp. 1996–1997, G. W. Brock et al., "Cursors for Use In Digital Displays."

IBM Technical Disclosure, "Cursor-Character Position Synchronization", Nicholson et al., vol. 20, No. 5, Oct. 1977, Cl. 340-709.

IBM Technical Disclosure, "Smooth Travel of Cross-hair Cursor", Hawes, vol. 26, No. 2, Jul. 1983, Cl. 340-709.

*Primary Examiner*—John W. Caldwell, Sr.
*Assistant Examiner*—Alvin Oberley
*Attorney, Agent, or Firm*—Mark S. Walker; Joseph J. Connerton

[57] ABSTRACT

A raster-scanned interlaced cathode ray tube display is refreshed from a bit buffer (1). Cursor control logic (17) compares the refresh address (3, 4) with a desired cursor address and generates cursor defining bit patterns in synchronism with the bit pattern derived from the bit buffer (1). The cursor control logic (17) also generates overlay information (25) to control the mixing of the bit streams in mixers (11, 12, 13) to produce a 2 or 3-pel wide cross-hair cursor on the CRT screen. The cursor lines can be black, white or transparent. The overlay signal may also be used to control a further optional mixer combining the composite cursor bit-buffer bit patterns with bit patterns derived from a coded character buffer containing coded alphanumeric characters to be displayed.

9 Claims, 6 Drawing Sheets

RASTER-SCANNED CATHODE RAY TUBE DISPLAY WITH CROSS-HAIR CURSOR

BACKGROUND OF THE INVENTION

This invention relates to a raster-scanned cathode ray tube display with a cross-hair cursor and more particularly to a multiple line cross-hair cursor.

Raster-scanned cathode ray tubes having bit-per-pel refresh buffers or mapped memories are well known in the art. Also known in the art are cross-hair cursors which allow an operator to interact with the CRT screen using either a keyboard or a graphics attachment such as a "mouse" to move the cursor around the screen.

Operator productivity and usability of the display are enhanced by employing a two or three line cross-hair cursor, i.e., a cursor formed with two or three horizontal lines and two or three vertical lines, with the intersection of the central lines of the three line cursor indicating the point of interest. Such a cursor can be made more legible than the normal single-line cross-hair cursor by controlling the display modes of the different lines. Thus, by making the central line of a three line cursor invisible—in effect displaying a hollow cross—the point of interest at the intersection will not be obscured when the cursor is positioned over it. In other instances, it may be desirable to allow an operator to select the cursor to display each line in a different color or intensity so that the cursor will always contrast with the background whatever the color or intensity of the latter.

To avoid the need to rewrite the bit buffer every time the cursor is moved, it is preferred that the cursor defining bits should be generated and mixed with the bit pattern outside the buffer.

For front-of-screen performance reasons, conventional cathode ray tube displays use interlaced scan lines so that "odd" and "even" fields are interleaved to form a frame. A problem arises with an interlaced display using a two or three line cursor, since the different lines of the cursor will be displayed on different fields. The present invention provides a solution to this problem and allows control of the cursor with a minimum of logic. In addition, use of a 2 or 3-line cursor provides a steadier, less flickery cursor than a single pel cursor on an interlaced display, since at least one line of the cursor can be refreshed at each field, whereas the single line cursor can only be refreshed every other field.

SUMMARY OF THE INVENTION

According to the invention, a raster-scanned cathode ray tube display comprises a cathode ray tube, a bit-per-pel refresh buffer for containing a bit pattern representing an image to be displayed on said cathode ray tube, address registers for addressing said buffer under control of refresh logic to produce a bit stream for driving the cathode ray tube and means for displaying a cross-hair cursor on said cathode ray tube, characterized in that said cross-hair cursor is constituted by lines of at least two pels thickness generated under control of cursor control logic adapted to compare the refresh address with a desired cursor position and to produce a bit pattern representing said cross-hair cursor and to insert said cursor representing bit pattern into and in synchronism with said bit stream to produce a composite bit stream representing the image to be displayed and a cross-hair cursor of at least 2 pels width.

BRIEF DESCRIPTION OF THE DRAWINGS

The invention will now be described, by way of example, with reference to the accompanying drawings, in which.

DESCRIPTION OF PREFERRED EMBODIMENT

Figure 1:
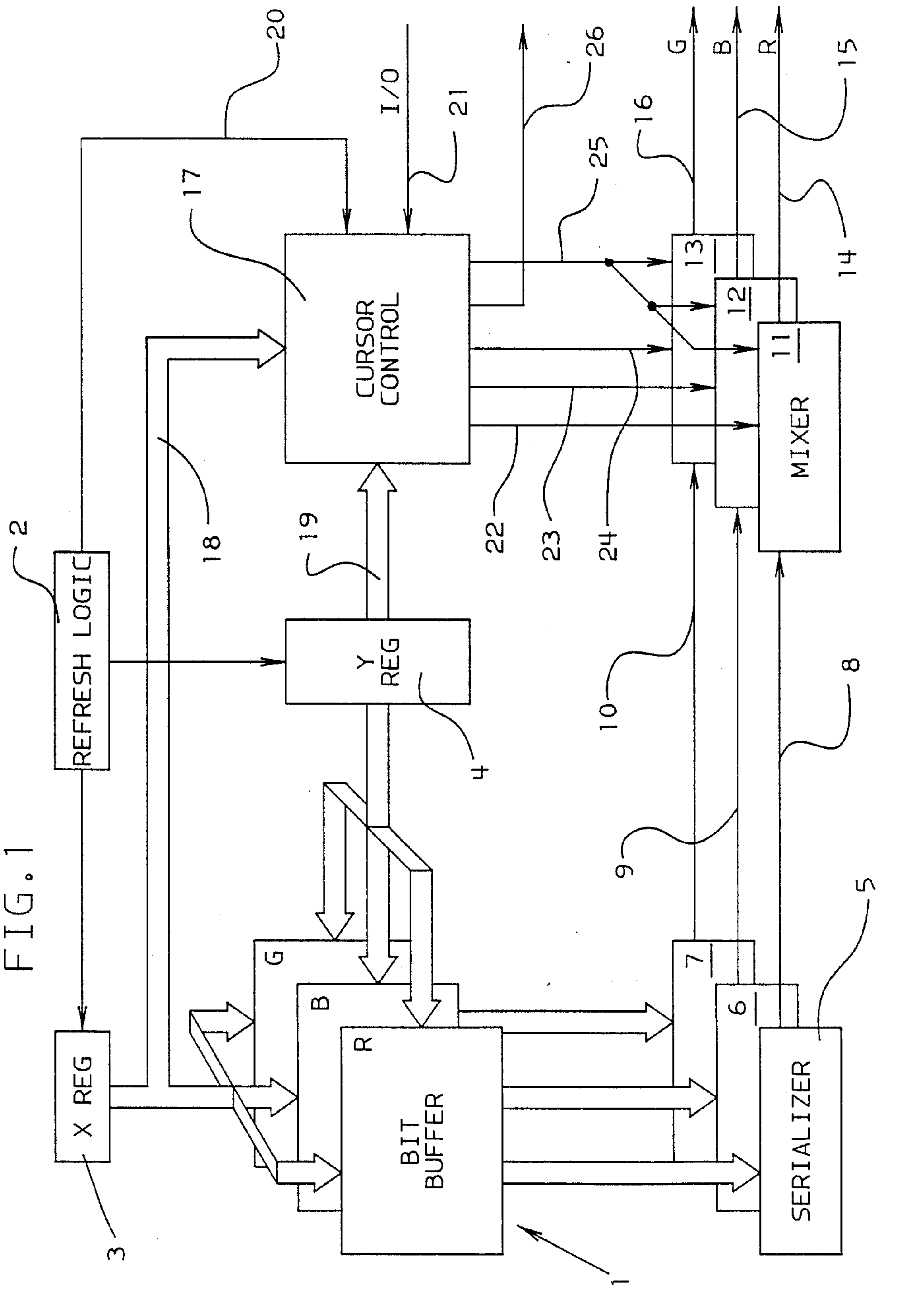
FIG. 1 is a block diagram showing principal components of a raster-scanned CRT display employing a bit-per-pel buffer for refresh.

Referring now to FIG. 1, a cathode ray tube (CRT) display, not shown, is refreshed from a mapped or bit buffer 1. The bit buffer 1 includes three planes, one for each of the three primary colors, red (R), blue (B) and green (G). Although not limited to use in a color display, the invention will be so described with reference to the preferred embodiment. However, it will be appreciated that a bit-per-pel buffer for a monochrome display would normally consist of a single plane, each pel (picture element) on the CRT screen requiring one corresponding bit in the bit buffer 1; additional bits may be used to identify different display attributes.

The bit buffer 1 consists of a random access memory (RAM) and includes bit patterns previously loaded therein to correspond to a desired picture or image to be displayed. Periodically, the cathode ray tube needs to be refreshed, and to this end refresh logic 2 periodically causes the bit patterns from the bit buffer 1 to be read by means of X and Y address registers or counters 3 and 4 respectively. The bit pattern is read out of each bit plane a byte at a time into serializers 5, 6 and 7 whose outputs 8, 9 and 10 respectively contain pel information for the red, blue and green electron guns of the CRT.

The serial bit patterns on lines 8, 9 and 10 are combined in mixers 11, 12 and 13 with cursor representing bits on lines 22, 23 and 24 in a manner to be described in detail below and the resultant composite bit streams are directed toward the CRT video circuits on lines 14, 15 and 16 respectively. Cursor control logic 17 is used to generate a cross-hair cursor on the screen. Rather than write the cursor in the bit buffer, the cursor control logic 17 inserts the required cursor bit pattern into the serial bit streams 8, 9 and 10 by means of mixers 11, 12 and 13 respectively. This has the advantage of improving the performance of the display, since the bit buffer does not need to be rewritten every time the cursor is moved on the screen.

The cursor bit pattern on lines 14, 15, and 16 is produced in synchronism with the bit pattern streams on lines 8, 9, 10 from the bit buffer 1, and to this end the cursor control logic 17 receives X and Y fresh address information on buses 18 and 19 respectively; and timing signals on line 20 from the refresh logic 2. Cursor position information is received on I/O line 21 from a keyboard or mouse or other I/O device (not shown) directly or indirectly from a display control unit (also not shown). The cursor control logic 17 produces control signals on lines 25 which control the operation of the mixers 11, 12 and 13 to determine, for example, whether the cursor is overlayed over the image defining bits on lines 8, 9 and 10. The purpose of optional control line 26 will be described in greater detail hereinafter. The preferred embodiment of the invention will be described in terms of a black, white or transparent cursor. If a colored cursor were required, additional signals would be supplied to mixers 11, 12 and 13 on lines 22, 23 and 24 respectively.

One of the problems encountered when using a three-line cross-hair cursor on an interlaced display is that the timing of the center line (and other lines) will depend on whether it is in an even field or an odd field. To this end the cursor control logic 17 determines which field is being displayed and whether the cursor is even or odd, i.e., the top line is in an even or odd field.

Figure 4:
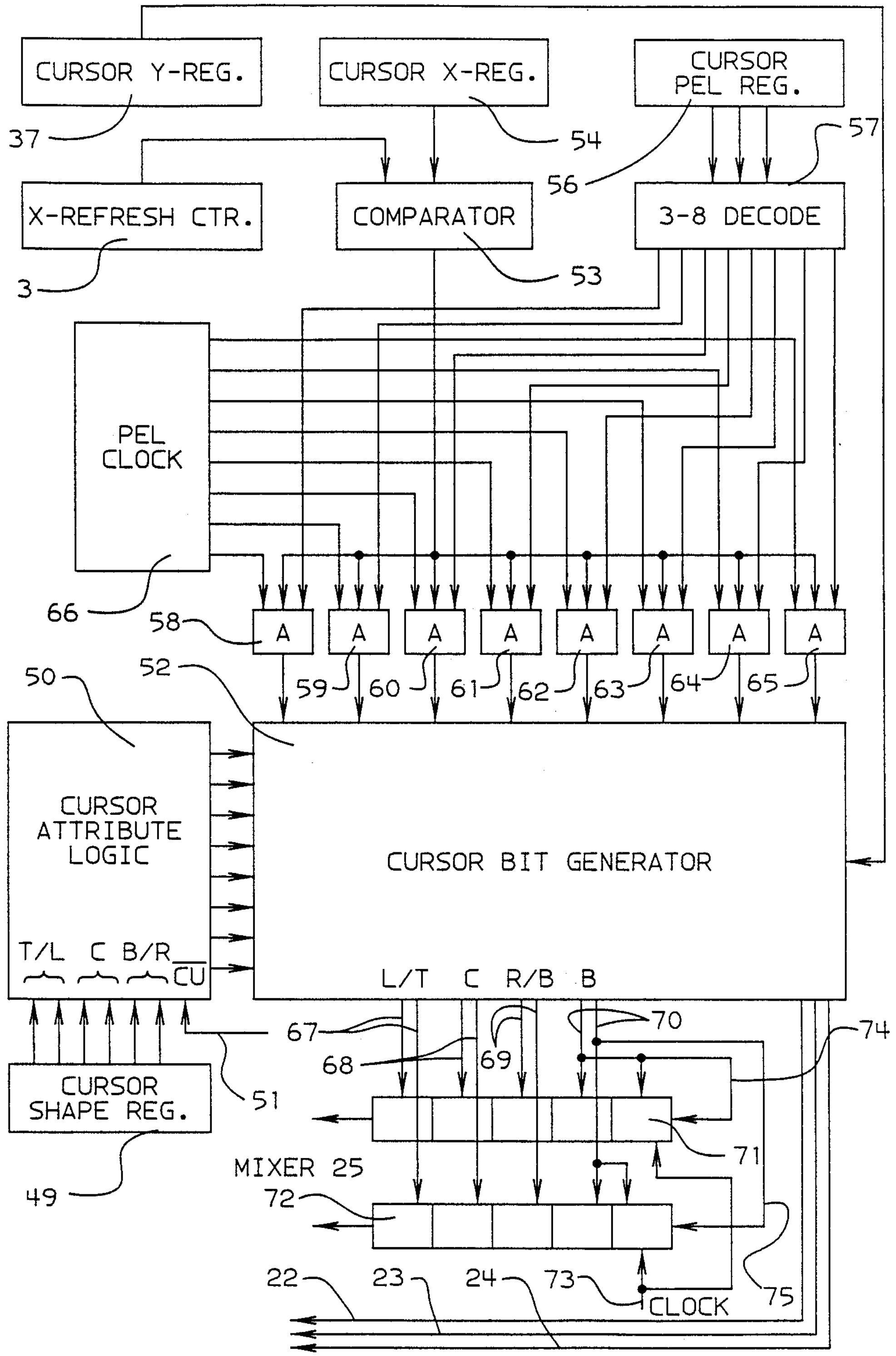
FIG. 4 is a logic diagram showing how bits representing the cross-hair cursor are generated.

The X refresh register or counter 3 causes sequential bytes of bits to be read out at the line specified by the Y refresh counter 4. The Y counter is incremented by 2 at each line flyback when refreshing the screen, starting at line "0" during even fields and at line "1" during odd fields. As shown in FIG. 4 and more fully described hereinafter, the cursor control logic 17 includes corresponding X and Y cursor registers, the contents of which are compared with the refresh registers 3 and 4 respectively. Ignoring the least significant bit of the Y refresh register 4 and the cursor Y register 37 (FIG. 4), whenever these registers match, either the top center line of the cursor will need to be displayed in that field or the center line of the cursor will be displayed in that field.

Figure 2:
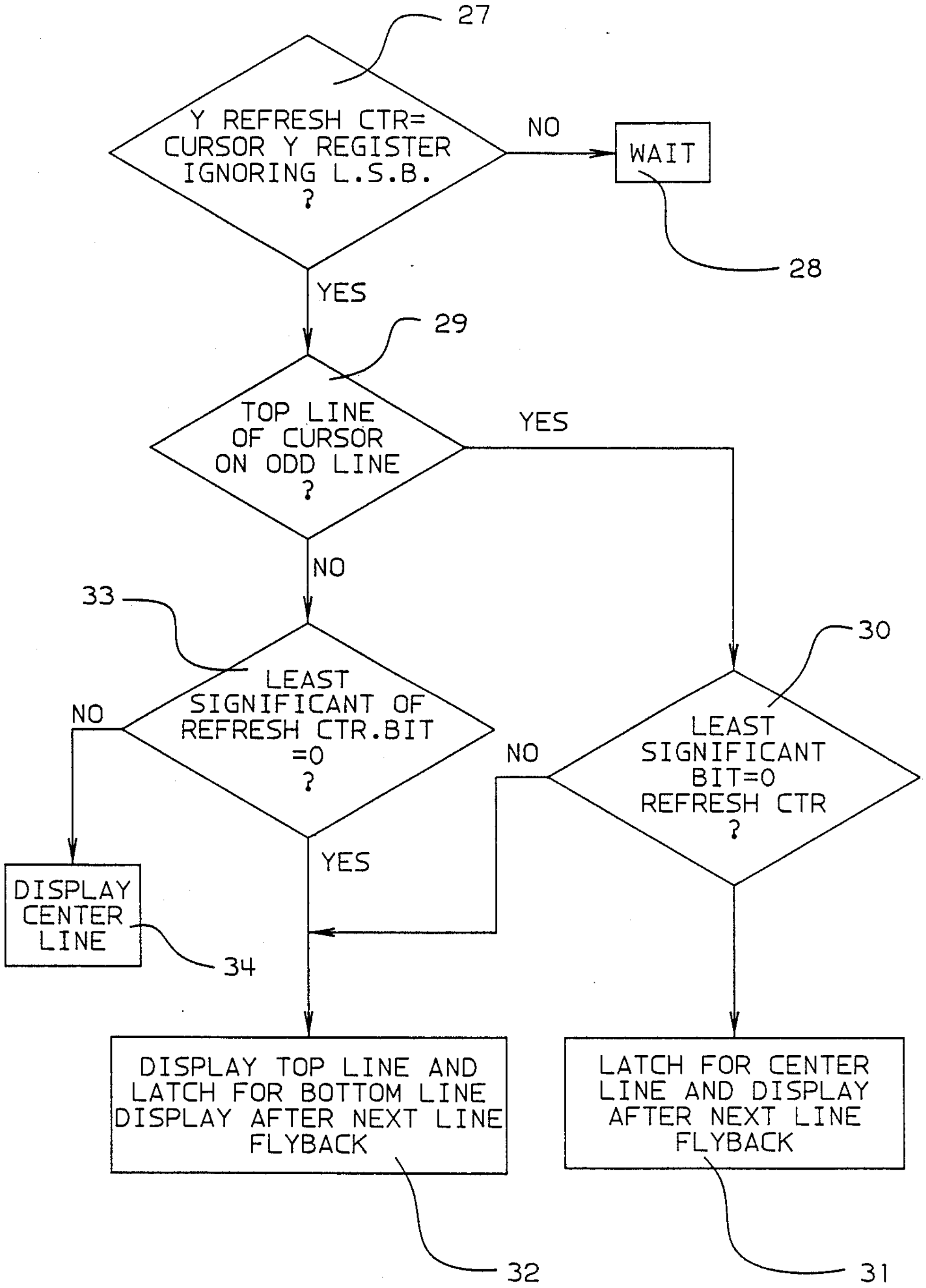
FIG. 2 is a flow chart indicating the logic operations needed to display a three-line cursor on an interlaced display.

FIG. 2 is a flow chart of the above described comparison operation. In step 27, a determination is made whether, except for the least significant bits, the contents of the Y refresh and cursor registers compare. If they do not compare, no cursor bits are inserted and the operation is in a wait mode illustrated as block 28. If they compare, a determination is made at step 29 as to whether the top line of the cursor is odd. If it is, a determination is made at 30 as to whether the least significant bit of the Y refresh register is 0 (signifying an even field). If it is, the equality is latched for the center line, which will be displayed after the next line flyback as at step 31. If it is an odd field, the top line is displayed and the equality latched for the bottom line to be displayed after the next line flyback as at 32.

If the determination at 29 was that the top line was on an even line, i.e. an even cursor, a determination is made at 33 as to whether the least significant bit of the Y refresh counter is "0" (signifying an even field) or a "1" (signifying an odd field). If it is an odd field the center line is displayed as at 34. If it is an even field, the top line is displayed and the equality latched for bottom line display after the next line flyback as at 32.

Figure 3:
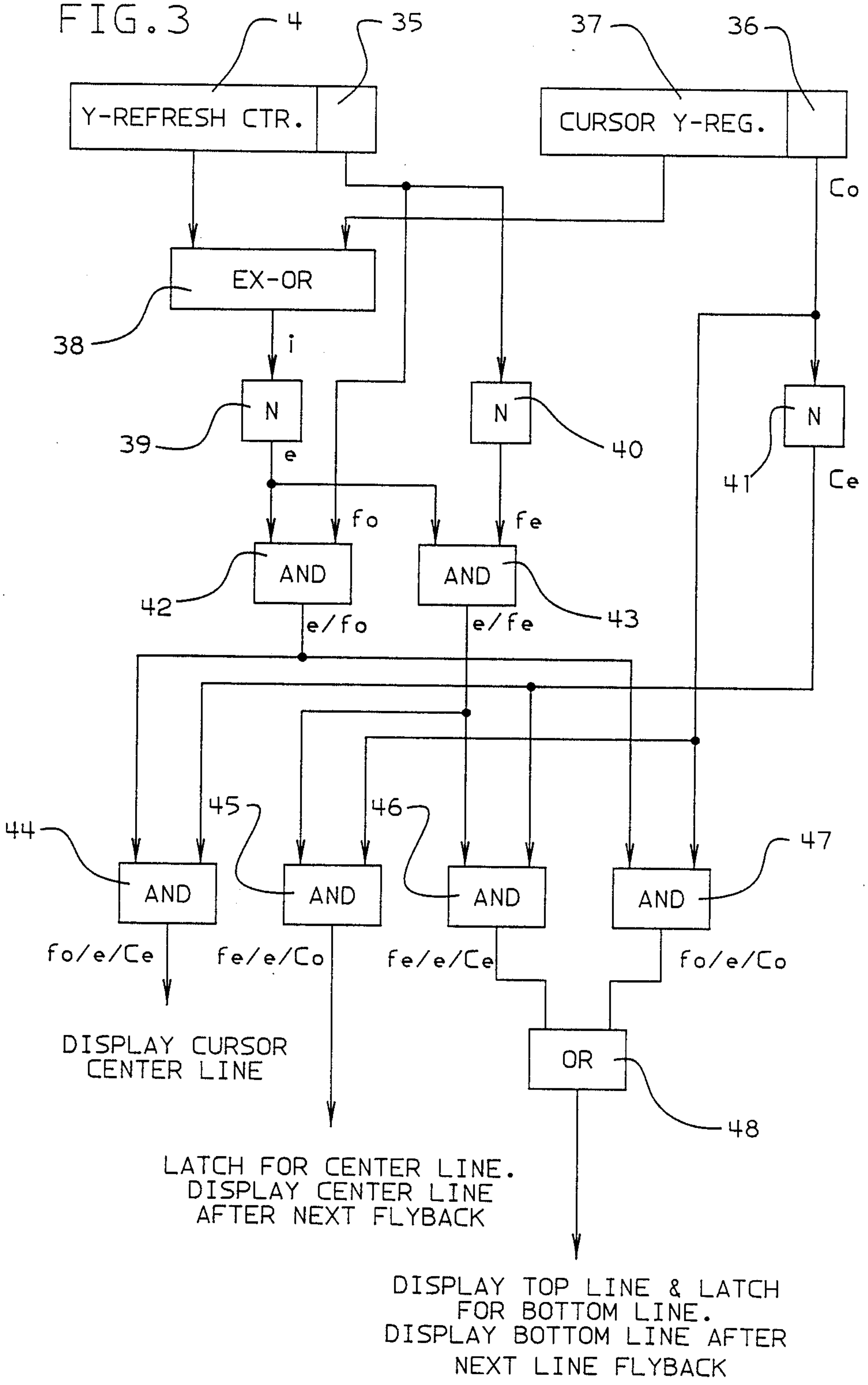
FIG. 3 is a diagram of logic for performing the functions shown in FIG. 2.

A logic implementation for this flow chart is shown in FIG. 3. The contents, except for the least significant positions 35 and 36 of the Y refresh counter 4 and the cursor Y register 37, are compared using an Exclusive-OR circuit 38 and inverter 39. The output of Exclusive-OR circuit 38 is up when there is inequality; that of inverter 39 is therefore up when there is equality. The output of the least significant bit position 35 will be up for odd fields: consequently the output of inverter 40 will be up for even fields. The output of bit position 36 will be up when the top line of the cursor is on an odd line: consequently the output of the inverter 41 will be up when the top line is on an even line.

The output of AND gate 42 will be up when the non-least-significant bits are equal and there is odd field. The output of AND gate 43 will be up when there is equality of the non-least-significant bits and an even field. The output of AND gate 44 will be up, corresponding to 34, FIG. 2, during odd fields when the Y cursor and Y refresh counts are equal and the cursor is even. The output of AND gate 45 will be up, corresponding to 31, FIG. 2, during even fields when the Y refresh and Y cursor registers match (except for the least significant bit) and the cursor is odd. AND gates 46 and 47 and OR gate 48 determine when the cursor top line can be immediately displayed with the bottom line being displayed after the next line flyback, corresponding to 32, FIG. 2.

FIG. 3 has described the logic required to ensure that the horizontal lines of the three line cursor are correctly displayed, taking into account the interlace. FIG. 4, on the other hand, illustrates the logic required to enter the vertical lines as well. Clearly the interlace does not affect the vertical lines of the cursor. However, before describing the logic of FIG. 4 in more detail, it will be convenient to discuss the conventions used for the three-line cursor in this preferred implementations. Other conventions and rules would require a different implementation.

The preferred rules are:

1. The cursor address is the address of its top and left hand lines, although the point of interest is the intersection of its center lines, i.e. displaced diagonally one pel.

2. Cursor lines can be black (all pels off), white (all pels on) or transparent - weak or dominant.

3. The left and top lines are given the same attributes, the horizontal and vertical cursor center lines are given the same attributes and the right and bottom cursor lines are given the same attributes.

4. The order of dominance of the cursor lines is as follows:

(a) Dominant transparency dominates all others.

(b) Cursor center lines dominate left (top) and right (bottom) cursor lines except dominant transparent.

(c) Left (top) cursor lines dominate over right (bottom) lines.

(d) Weak transparency is always dominated.

Examples of the use of these rules to obtain cursors of differing appearance will be described below with reference to FIGS. 6 to 9.

In FIG. 4, a 6-bit register 49 contains an indication of the cursor "shape" selected, that is, whether each of the top/left, center, or bottom/right cursor lines are dominant transparent, white, black or weak transparent. Cursor attribute logic 50 receives the contents of register 49, a signal indicative of whether a cross-hair cursor is required on line 51 and supplies an 8-bit byte representing how the cursor is to be displayed to a cursor bit generator 52.

A comparator 53 compares the contents of the X refresh counter 3 with the contents of a cursor X position register 54. The output 55 of the comparator 53 will be up when the byte addresses in registers 3 and 54 are equal. A 3-bit cursor pel register 56 contains a count of the position within the byte of the bit representing the left cursor line. A 3-to-8 decoder 57 supplies an 8-bit output connected one to each of eight AND gates 58 and 65 which have their second inputs connected to the output 55 of comparator 53.

Pel clock 66 has each of its eight output lines connected as the third input of its associated AND gate (58 to 65). It will be evident that when the bytes in register 3 and 54 match, the appropriate AND gate 58 to 65 will indicate to the cursor bit generator 52 where a cursor bit is to be inserted. Cursor generator 52 also receives an input from the cursor Y register 37, and, as described with reference to FIG. 3, will supply bits corresponding to the horizontal cursor lines.

By logically combining its various inputs in accordance with the cursor domination rules described above, the cursor bit generator 52 will produce outputs on line pairs 67, 68, 69 and 70 representing a 2-bit overlay code for the left/top, center, and right/bottom lines of the cursor. Optionally, bits representing colored cursor lines can be produced on lines 22 to 24. The code on line pair 70 represents the background of the cursor. The overlay codes are supplied in parallel to two shift registers 71 and 72 from which the codes are shifted serially by means of the clocked input 73. Although 5-stage shift registers are shown, only 3 stages are actually required to receive the L/T, C and R/B codes. The background codes on line 70 are entered into all other stages including the shift register inputs 74 and 75.

The pairs of codes on line 25 are supplied to the mixers 11, 12 and 13, FIG. 1 and control the mixing. The codes "00" and "01" are used to signify non overlay of the cursor, that is, the cursor bit would not be inserted giving a transparent cursor line. The codes "10" and "11" are used to signify overlay of the cursor, either black or white. To display a black cursor, any bit from the bit buffer would need to be turned off. To display white, a bit would need to be inserted if there were none present.

Figure 5:
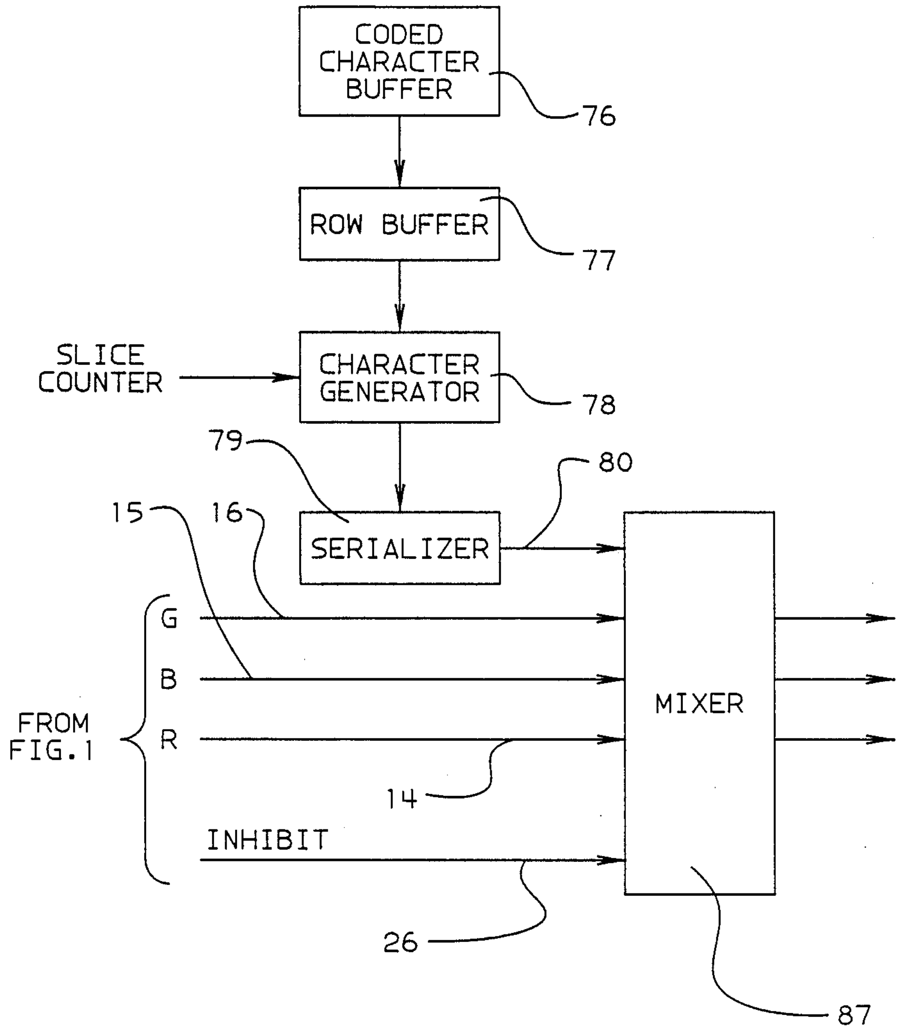
FIG. 5 shows a modification in which a coded character buffer is used in addition to the bit-per-pel buffer of Figure 1.
Figure 6:
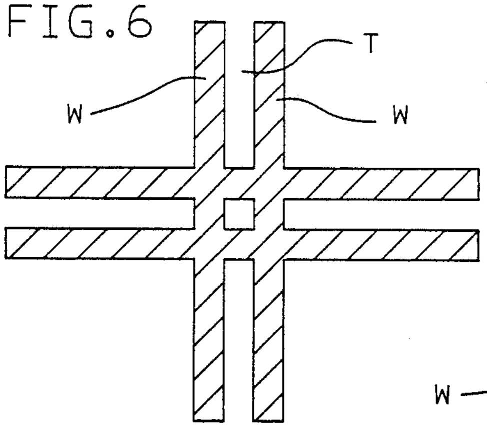
FIGS. 6 to 9 show various appearances for the three-line cursor showing the versatility thereof.

As mentioned above, the overlay signals can be used in an optional variation in which a coded character buffer is used in addition to the bit-for-pel buffer 1, FIG. 1. Such an arrangement is shown schematically in FIG. 5 in which a coded character buffer 76 contains character codes corresponding to alphanumeric characters or other symbols to be displayed on the cathode ray tube (not shown). In well known manner, the refresh logic, not shown in FIG. 5, accesses the character buffer 76 and loads character codes, a byte at a time, into a row buffer 77. The row buffer 77 is used to derive the bit pattern to display that row of characters on the screen from a character generator 78 constituted by random access memory RAM and/or read only memory ROM. Each character is formed as a series of slices requiring the character generator to be addressed by a slice counter as well as the row buffer 77. Each slice of bit pattern is loaded in parallel into a serializer 79 where it is serialized for onward transmission to the CRT along line 80.

In accordance with this embodiment of the invention, the bit stream is added to the bit streams on the lines 14, 15 and 16, from the bit buffer and cursor generator (FIG. 1). Normally, the bit pattern on line 80 is overlaid on the bit stream on the lines 14, 15 and 16 in a mixer 87. However, the input 26, containing a code representing the overlay signal, is used to inhibit overlay of the bit stream on line 80 for bits in the composite bit stream on lines 14, 15 and 16 derived from the cursor bit generator 52.

Figure 7:
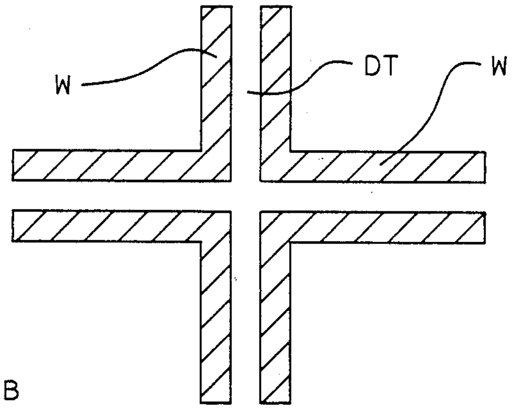
Figure 8:
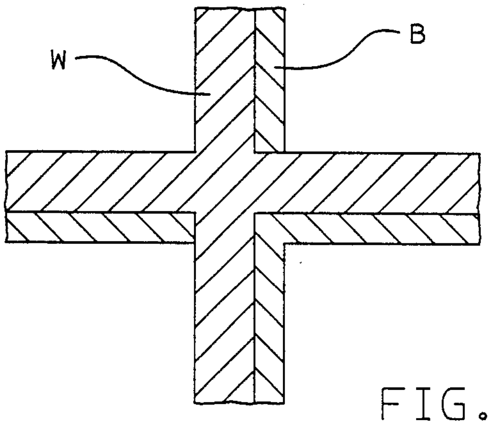
Figure 9:
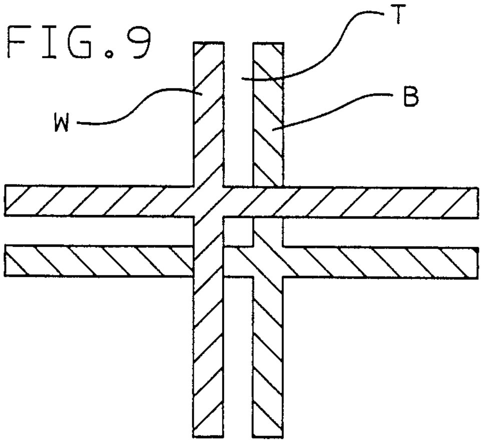

FIGS. 6 to 9 illustrate various cursor configurations. Thus in FIG. 6, the left/top and right/top cursor lines have been designated white (W) with the center lines transparent (T). The addressed pel is visible and this combination is particularly useful on color displays. FIG. 7 shows the effect of making the center line dominant transparent (DT). Setting the cursor to black, white, black or transparent, white black helps to make the cursor stand out in a "busy" picture where it would otherwise blend into the background. Setting to white, white, transparent or white, white, white gives a 2 pel or 3 pel wide cursor. This results in an improved appearance on an interlaced display whereas a one pel wide cursor would flicker. FIGS. 8 and 9 show the effect of using white, white, black (W, W, B) and white, transparent, black (W, T, B) respectively, the use of the black giving a pleasing "shadow" cursor which is steady and easily picked out. Note that the point of interest is obscured by the cursor of FIG. 8 but not by that of FIG. 9.

It is preferred that the cursor has 3 pel wide lines as described. However, many of the advantages can also be obtained, although not perhaps to the same extent, with a two pel wide cursor: some simplification of the logic would result, although it would be less versatile.

We claim:

1. A display system for selectively generating and displaying an image including a multi-line cross-hair cursor comprising, in combination, a cathode ray tube display operated in a raster-scanned interlaced mode, a bit-per-pel refresh buffer containing a bit pattern corresponding to the image to be displayed on the screen of said cathode ray tube, refresh logic means including address registers for addressing said refresh buffer to produce a data bit stream for driving said cathode ray tube display, said cross-hair cursor being constituted by lines of two or more pels thickness to provide at least two horizontal lines generated under control of cursor control logic, said cursor control logic being adapted to compare the cursor address in said refresh buffer with a desired cursor position and generate a bit pattern representing the configuration of said cross-hair cursor, said cursor control logic including means for determining whether said refresh buffer address designates an odd or an even field;

means to determine whether said horizontal lines of said cursor are in said odd or even field, and means for inserting said cursor representing bit pattern of at least two horizontal lines into the proper fields in synchronism with said data bit stream to produce a composite bit stream representing said image and said associated cross-hair cursor.

2. A display system as claimed in claim 1 wherein said means for determining whether said refresh buffer address designates an odd or an even field comprises means for examining the least significant bit position of one of said address registers, means for comparing the other bit positions of said one address register with the desired cursor position, and means for determining whether the top line of said multi-line cursor is in said odd or even field by examining the least significant bit of said desired cursor position and for producing a cursor defining bit pattern to display said cross-hair cursor in accordance with these determinations.

3. A display system as claimed in claim 2 wherein said cursor control logic includes means for producing a signal indicative of the appearance of said cursor and cursor bit generation logic for producing an overlay signal to control mixing of the cursor bit pattern with said bit stream in accordance with said appearance indicating signal.

4. A display system as claimed in claim 3 wherein the left and top cursor lines are displayed in a manner similar to one another and the right and bottom cursor lines are displayed in a manner similar to one another.

5. A display system as claimed in claim 2 further comprising a plurality of video mixers associated with a plurality of input lines for combining said cursor representing bit patterns with said display image bit pattern, wherein said cursor control logic is adapted to display the cursor lines in accordance with attributes entered into said video mixers.

6. A display system as claimed in claim 5 wherein said cursor is displayed as a 3-pel-wide cursor and in which cursor attribute logic produces a signal indicative of the appearance of said cursor in accordance with the center lines of said cursor dominating the left and top lines of said cursor which in turn dominate the right and bottom lines of said cursor respectively.

7. A display system as claimed in claim 6 wherein any cursor line can be designated to be dominant or weak, a dominant transparent cursor line dominating all other cursor lines and a weak transparent cursor line being dominated by all other cursor lines.

8. A display system as claimed in claim 3 further comprising a coded character buffer containing character codes representing alphanumeric or other symbols to be displayed, a character generator containing bit patterns representing characters, and mixing means adapted to mix bit patterns derived from said character generator with bit patterns derived from said bit-for-pel refresh buffer and said cursor control logic.

9. A display system as claimed in claim 8 in which bit patterns derived from said character generator normally dominate the bit pattern derived from said bit buffer, said mixing means being responsive to a signal from said cursor control logic to prevent domination of cursor bits by alphanumeric bits.

* * * * *